April 21, 1959 W. A. RAY 2,882,682
FLUID PRESSURE OPERATED CONTROL MECHANISM
Filed Dec. 2, 1955 3 Sheets-Sheet 1

INVENTOR,
WILLIAM A. RAY
BY
Flam and Flam
ATTORNEYS.

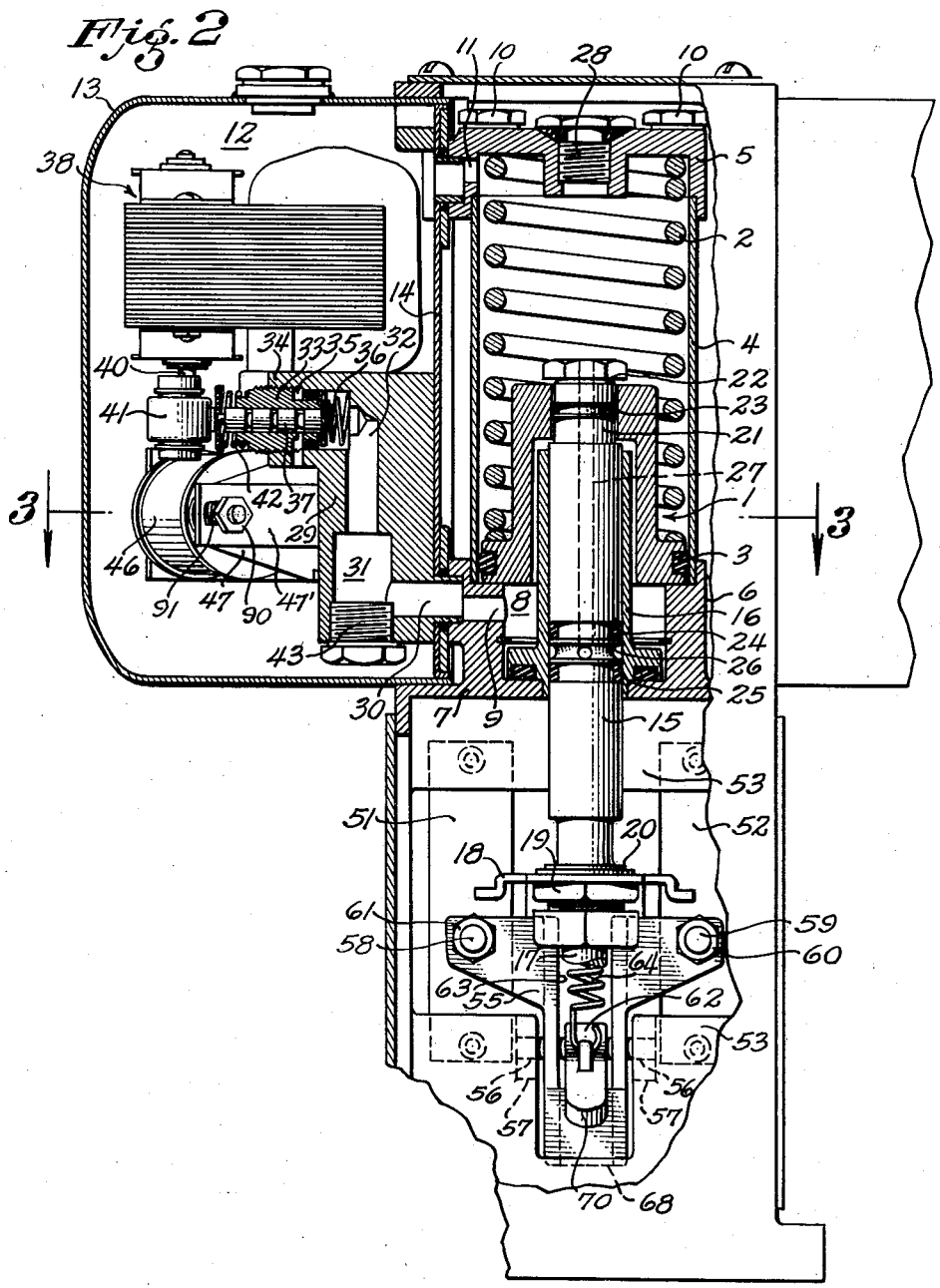

April 21, 1959 W. A. RAY 2,882,682
FLUID PRESSURE OPERATED CONTROL MECHANISM
Filed Dec. 2, 1955 3 Sheets-Sheet 3
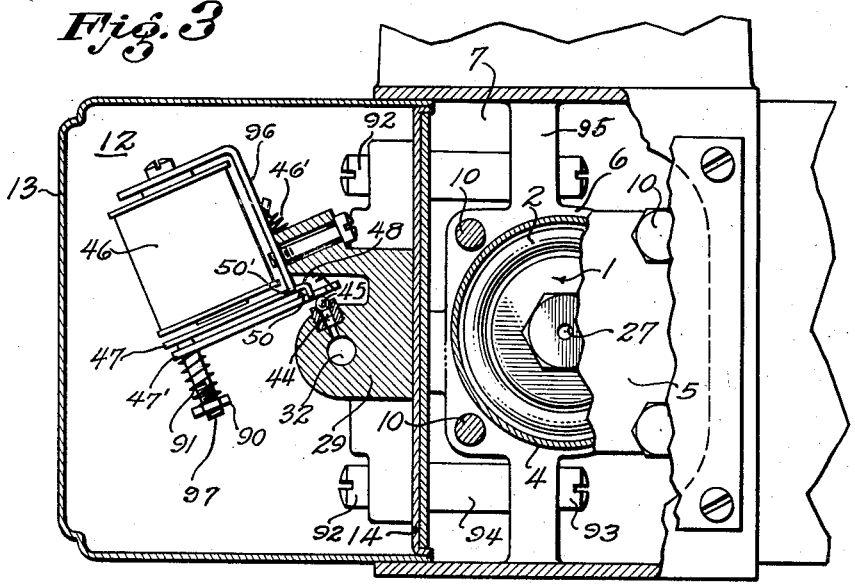
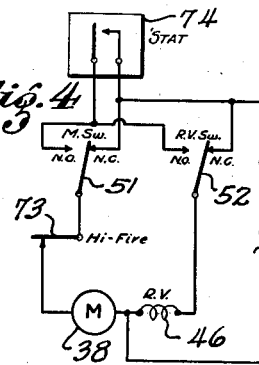
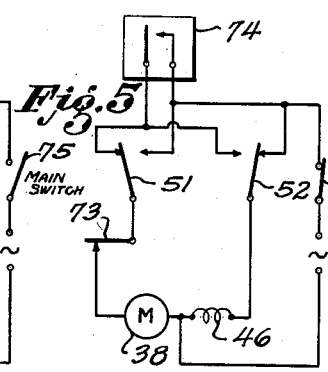
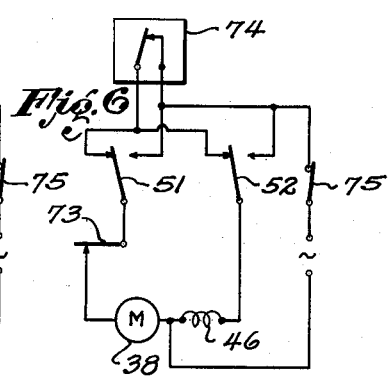
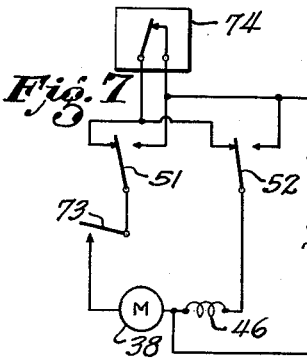
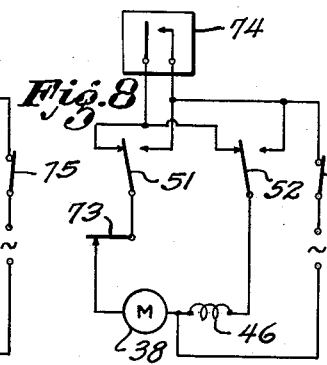
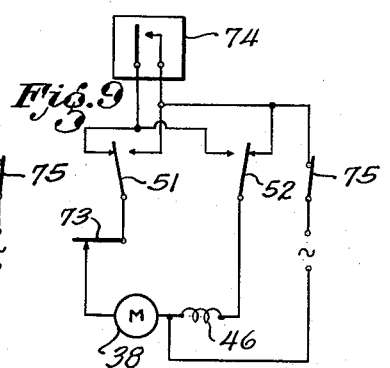
INVENTOR.
WILLIAM A. RAY
BY Flam and Flam
ATTORNEYS.

United States Patent Office 2,882,682
Patented Apr. 21, 1959

2,882,682

FLUID PRESSURE OPERATED CONTROL MECHANISM

William A. Ray, North Hollywood, Calif., assignor to General Controls Co., a corporation of California Application December 2, 1955, Serial No. 550,569

15 Claims. (Cl. 60—52)

This invention relates to a control mechanism in which the control operates in accordance with variations in temperature, pressure, or analogous conditions. More particularly, the invention contemplates the employment of a fluid-pressure motor operated actuator, adapted to adjust the position of a valve or other control medium. The actuator may operate one or more devices, such as dampers, valve closures, etc.

It is one of the objects of this invention to improve, in general, such pressure-operated motor.

Such fluid-pressure motor mechanisms have been proposed, having a movable wall (for example, a piston or diaphragm) for moving the actuator between two extreme positions. Thus, a fuel valve or damper may be operated between fully closed and fully open positions, as required by temperature conditions in a room or space.

It is another object of this invention to make it possible to operate the actuator between an intermediate and an end position, under the influence of a condition-responsive device, so that the damper, valve, or other load can operate between a "low" and a "high" position. When used to operate a fuel valve, the valve will be moved to open or high-fire position when the temperature of a space drops, and will be returned to an intermediate or low-fire position when the temperature reaches a limiting high value.

It is another object of this invention to provide a high and an intermediate position in a simple and effective manner, and particularly without interfering with a complete shut-down in response to a remote control device, such as a circuit controller.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 2 is a longitudinal sectional view taken along a plane corresponding to line 2—2 of Fig. 1;

Fig. 3 is a cross-sectional view taken along a plane corresponding to line 3—3 of Fig. 2; and Figs. 4 to 9, inclusive, are schematic wiring diagrams illustrating alternative or successive positions of the control circuits embodied in the invention.

Figure 1:
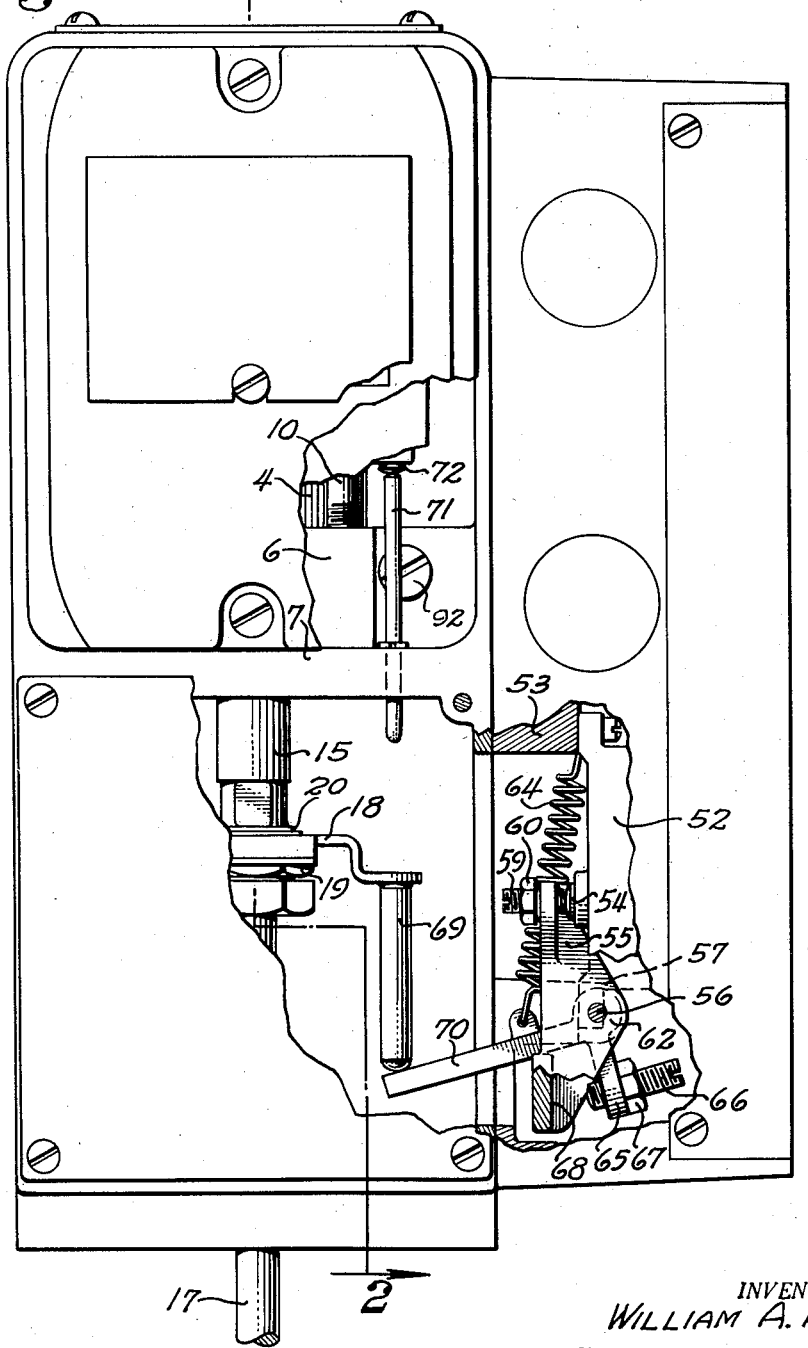
Figure 1 is a front elevation of an apparatus incorporating the invention, a portion of the casing being broken away.

Liquid, such as oil under pressure, is utilized to move a piston structure 1 (Figs. 2 and 3) upwardly and against the force of a compression spring 2. This piston structure includes appropriate sealing means, such as an O-ring 3, located in a groove in the piston structure and cooperating with the internal wall of a cylinder 4.

This cylinder 4 is shown, in the present instance, as comprising a tubular member having an upper head 5 and a lower head 6. The lower head 6 has a base portion 7 which serves as a support for additional elements of the structure as hereinafter described.

The lower head 6 is provided with a recess or chamber 8 immediately below the piston structure 1. This space 8 communicates with a radial port 9 through which fluid under pressure may pass for urging the piston upwardly.

The upper head 5 is attached to the lower head 6 by the aid of a plurality of bolts 10.

The upper head 5 is also provided with a port 11 communicating with the interior of cylinder 4, and a chamber 12 provided by a container 13. This container 13, as shown most clearly in Figs. 2 and 3, may be formed of sheet metal. Its right-hand wall 14 serves to define a right-hand space in which the cylinder and piston structures are accommodated. Space 12 is adapted to be filled with hydraulic liquid for operation of the piston structure 1.

The piston structure 1 is connected to an actuator 15 guided in a stationary sleeve 16. This sleeve 16 is appropriately attached to the base 7. The actuator 15 may have a downwardly extending stem 17 (Fig. 1) for operating a fuel valve, a damper, or other load. It may also be provided with another operating member 18 (Fig. 2) for performing another function. This operating member 18 is attached to the actuator 15 in any appropriate manner as by the aid of a nut 19 threadedly engaging a portion of the actuator 15 and urging the member 18 against a flange structure 20 formed on the actuator 15.

The actuator 15 is provided with a reduced upper portion 21 extending through the upper wall of the piston structure 1. This upper wall has a stop screw 22 to limit the relative movement between the actuator 15 and the piston structure 1.

The reduced portion 21 carries an O-ring 23. Similar O-ring structures 24 and 25 are carried on the actuator 15 on opposite sides, respectively, of an annular groove 26. A central port 27 extending from the annular groove 26 upwardly through the actuator 15 and the stop screw 22 permits escape of any trapped liquid within the bearing bushing or sleeve 16. A similar screw 28 is located in the upper head 5.

A pump structure for providing the operating fluid pressure is mounted on a frame 29. This frame is shown as secured to ribs 95 on base 7, as by screws 92 passing through wall 14. These screws engage threaded apertures in spacers 94. Additional screws 93 pass through the ribs 95 and engage threaded apertures in the spacers 94.

The pump structure is submerged below the level of the liquid in chamber 12.

The port 9 which transmits liquid under pressure to the lower side of the piston structure 1 communicates with an enlarged port 30 and vertical ports 31 and 32 formed in the frame 29. A plug 43 closes the lower end of port 31.

The pump structure proper includes a horizontally arranged cylinder structure 33 threaded into a boss 34 formed on frame 29. This cylinder structure is provided with an annular groove 35 in communication with the chamber 12 to form an inlet passage to the pump. A spring-pressed valve plate 36 resiliently closes the right-hand end of the cylinder structure 33 to form an outlet valve for the pump.

Operating within the cylinder structure is a reciprocating pump piston 37. This pump piston 37 serves to urge liquid under pressure past the valve closure 36 and thence through ports 32, 31, 30 and 9 to the space 8.

The piston 37 is reciprocated by the aid of an electric motor 38 mounted upon the frame 29 and having a shaft 40. The shaft 40 operates an eccentric member 41 that, during a portion of its revolution, urges the piston inwardly against the compressive force of a spring 42.

When the motor 38 is energized as hereinafter described, the piston 37 reciprocates within the cylinder structure 33.

In order to render the pumping function ineffective even during operation of the piston 37, use is made of a by-pass port 44 (Fig. 3) leading to the port 32. This by-pass port communicates with the interior of chamber 12 and below the liquid level therein.

A ball closure 45 is seated at the outer end of the port 44. It is held firmly in engagement with its seat when an electromagnet 46 is energized. This electromagnet has an armature 47 which has slots engaging projections 50' located in the lower portion of the electromagnet frame 96. The armature 47 has depending portions 48 acting as a guide for a lever 47' pivoted on knife edge 50. This lever 47' is resiliently urged upwardly by a compression spring 91 disposed around a post 97 attached to the armature 47 and passing through a clearance aperture in the lever 47'. A nut 90 is disposed on the end of the post 97 and serves to adjust the force of spring 91.

The right-hand portion of the lever 47' urges ball 45 to seated position in the energized condition illustrated.

When the electromagnet 46 is de-energized the armature 47 moves downwardly about its pivot point formed by projections 50' allowing lever 47' to release its pressure on ball 45. However, when there is excessive hydraulic pressure in port 44, the force of spring 91 may be overcome and the ball 45 is permitted to unseat.

Since the general construction of the hydraulic motor is well known, further detailed description thereof is unnecessary.

When the motor 38 is energized and the by-pass port 44 is closed, the piston structure 1 is urged upwardly against the force of the spring 2. Upward movement of the piston structure 1 causes corresponding movement of the actuator 15.

Movement of the actuator 15 from an extreme lowered position to an intermediate position, and thence to an extreme upper position can be effected by the aid of control circuits. These control circuits are provided with snap-action circuit controllers. A pair of such circuit controllers 51 and 52 is provided appropriately fastened upon a support 53. Each of these circuit controllers is provided with a depressible plunger 54 for moving the contact arm between two stationary contacts, in a well understood manner, with a snap action.

Operation of these plungers 54 is effected by the aid of a lever 55 mounted for free rotation about a pivot pin 56. This pivot pin extends through ears 57 formed on the wall 53.

As shown most clearly in Fig. 2, the lever 55 is provided with a left-hand operating member 58 cooperating with the left-hand circuit controller 51. Similarly, a right-hand operator 59 is arranged to cooperate with the right-hand circuit controller 52.

Each of these operators 58 and 59 is in the form of a threaded stud adjustably mounted on the lever 55 and held in adjusted position by a nut 60 or 61. Accordingly, the sequence of operation of the snap switches forming the circuit controllers 51 and 52 may be predetermined.

The lever 55 is adapted to be moved in a clockwise direction about pin 56 by the aid of a bell crank lever 62. This bell crank lever is pivoted upon the pin 56 within a channel 63 formed between the right and left-hand sides of the lever 55. The bell crank lever is urged continuously in a clockwise direction by the aid of a tension spring 64 anchored to the longer arm 70 of the lever 55 at one end and anchored at its upper end to a stationary part of the mechanism.

The lever 62 carries a short arm 65 having an adjustable operating screw 66. This operating screw can be held in adjusted position by the aid of a nut 67.

The left-hand end of the screw 66 is adapted to contact the surface 68 formed on the lever 55. The extent of angular movement of the lever 62 before actuating the lever 55 is thus rendered adjustable. Furthermore, the sequence of the operation of the two circuit controllers 51 and 52 is also controllable by adjustment of the operating screws 58 and 59.

The actuator 15 carries a pin 69 having an axis parallel to the axis of movement of the actuator 15. It is adapted to cooperate with the longer arm 70 of the lever 62.

In the lowermost position of the actuator 15, indicated in full lines in Fig. 1, the plungers 54 for both circuit controllers 51 and 52 are released, and only the normally closed contacts are in engagement. As the actuator 15 moves upwardly, the lever 70 is allowed to move in a clockwise direction under the influence of spring 64. The operating screw 66 is later caused to engage surface 68, and lever 55 is then urged in a clockwise direction, first to operate one of the circuit controllers, such as 51. Continued upward movement of the actuator 15 permits the spring 64 to move the lever 55 further in a clockwise direction to operate the circuit controller 52. Both circuit controllers 51 and 52 are, for continued movement of actuator 15, maintained in the position corresponding to the inward position of the operating plungers 54. The required force for this is obtained by the tension force of spring 64.

The operating pin 69 may continue to move upwardly and ultimately to contact the bottom end of a pin 71. This pin 71 operates a plunger 72 associated with a limit switch. This limit switch, as hereinafter explained, serves to de-energize the pump motor 38, and the upward movement of the actuator 15 is stopped. The limit switch does not de-energize the electromagnet 46, and therefore the closure 45 remains seated. Accordingly, the actuator 15 is maintained in its uppermost position.

The sequence of operation can be described in connection with Figs. 4 to 9, inclusive.

In Fig. 4 the system is shown as under the influence of a condition-responsive device, such as a thermostat 74, and is used, for example, to control a fuel valve for heating a room. All of the circuits are de-energized while the main switch 75 is open; and switches 51 and 52 are in the position shown in Fig. 4. Accordingly, the compression spring 2 serves to move the actuator 15 to its lowermost position, as illustrated in Fig. 2.

Now let us assume that switch 75 is closed, to assume the position of Fig. 5. The electromagnet 46 controlling the relief valve closure 45 is energized through the circuit controller 52. The pump motor 38 is also energized through a parallel circuit, including circuit controller 51 and the limit switch 73 that is closed until operated by the upward movement of plunger 72. In this position, the pump being active, the actuator 15 can rise. As the pin 69 moves upwardly, as viewed in Fig. 1, the circuit controller 51 is first moved to the position of Fig. 5. Assuming that the thermostat 74 is still open, the circuit through electromagnet 46 is still active, and the actuator 15 is stopped at an intermediate position, the motor 38 being de-energized by operation of snap switch 51. The position of the actuator 15, corresponding to low-fire, is maintained because of the trapped liquid in cylinder 4.

Let us now assume that the room demands heat and the thermostat 74 closes. When this occurs, as shown in Fig. 6, the circuit through motor 38 is reestablished through thermostat 74. The actuator 15 then rises beyond the low-fire position. At the very beginning of its continued upward movement, the circuit controller 52 assumes the position of Fig. 6. The electromagnet 46 for the relief valve is now energized through the thermostat 74 and switch 52. The actuator 15 continues to rise until the limit switch 73 opens and motor 38 is de-energized.

This position is shown in Fig. 7. So long as the thermostat 74 is closed and the relief valve is also closed, the actuator 15 remains in its high position.

Now let us assume that the thermostat 74 returns to the open position of Fig. 8, the heating requirements now being satisfied. This serves to open the parallel circuits through the motor 38 and electromagnet 46. The actuator 15 is then lowered by the action of the compression spring 2, and the limit switch 73 is closed. This lowering continues until the position of Fig. 9 is reached. In this position, circuit controller 52 is allowed to move back to its normal position by movement of the pin 69 to a point sufficient to release the lever 55. In this position, the electromagnet 46 remains energized, but the circuit through motor 38 remains interrupted through the thermostat 74. The actuator 15 has thus been moved downwardly to this intermediate position and remains there until the thermostat 74 again closes. When the thermostat closes, the circuit corresponds to those illustrated in Fig. 6 and the actuator 15 rises until the limit switch 73 is opened, as shown in Fig. 7.

Normally therefore the actuator 15 is moved between an intermediate and a high position corresonding to an open and closed position of the thermostat 74.

Should it be desired to shut down the system, the main switch 75 is opened and the circuits return to the position of Fig. 4. In this position, both motor 38 and the relief valve electromagnet 46 are de-energized, and the actuator 15 is urged to its lowermost position.

The inventor claims:

1. In a system of the character described: a fluid-pressure motor having an actuator, a source of motion for creating fluid pressure to operate the motor for moving the actuator in one direction, as well as means for urging the actuator in the other direction while said source of motion is ineffective; means responsive to motion of the actuator under the influence of said fluid pressure to an intermediate position, for stopping the source of motion, and for maintaining said fluid pressure to hold the actuator in said intermediate position; condition-responsive means for energizing said source of motion to move the actuator beyond said intermediate position; and means effective upon movement of the actuator beyond said intermediate position to place the pressure maintaining means under the control of said condition-responsive device.

2. In a system of the character described: means forming a fluid-pressure cylinder; a movable wall in the cylinder; a pump for supplying fluid under pressure to the cylinder for moving the wall in one direction; an actuator moved by the wall; means for relieving the pressure in the cylinder; means for moving the wall in the other direction upon relief of said pressure; means for de-energizing the pump; means for operating the relieving means to render said relieving means optionally active or inactive to relieve the pressure; means responsive to motion of the actuator under the influence of said fluid pressure to an intermediate position for stopping the pump, and for causing the relieving means to maintain the pressure; condition-responsive means for energizing said pump to move the actuator beyond said intermediate position; and means effective upon movement of the actuator beyond said intermediate position to place the pressure-relieving means under the control of said condition-responsive device.

3. In a system of the character described: means forming a fluid-pressure cylinder; a movable wall in the cylinder; a pump for supplying fluid under pressure to the cylinder for moving the wall in one direction; an actuator moved by the wall; means for relieving the pressure in the cylinder; means for moving the wall in the other direction upon relief of said pressure; means for de-energizing the pump; means for operating the relieving means to render said relieving means optionally active or inactive to relieve the pressure; means responsive to motion of the actuator under the influence of said fluid pressure to an intermediate position for stopping the pump, and for causing the relieving means to maintain the pressure; condition-responsive means for energizing said pump to move the actuator beyond said intermediate position; and remote means for independently controlling said relieving means.

4. In a system of the character described: a hydraulic motor operated by fluid pressure and having end positions and an intermediate position; means urging the motor to move to an end position; means for optionally relieving the fluid pressure acting on the motor for causing the motor to move to said end position; a condition-responsive device for controlling said motor; means independent of said condition-responsive device to move the motor to said intermediate position; means operated by movement of the motor to the intermediate position, for placing the motor under the influence of the condition-responsive device; and means operated by movement of the motor beyond the intermediate position and toward the other end position for placing the relieving means also under the influence of said condition-responsive device.

5. In a system of the character described: a hydraulic motor operated by fluid pressure and having end positions and an intermediate position; means for optionally relieving the fluid pressure acting on the motor for causing the motor to move to an end position; an electric motor-operated pump for supplying fluid under pressure to the hydraulic motor; a condition-responsive device for controlling said electric motor; a pair of circuit controllers for the electric motor and for rendering the relieving means optionally active to relieve the pressure; and means operated upon movement of the hydraulic motor from the intermediate position toward the other end position, for operating said circuit controllers in sequence to place the electric motor under the control of the condition-responsive device, and then to place the relieving means also under the influence of said condition-responsive device.

6. In a system of the character described: a hydraulic motor having end positions and an intermediate position; means for optionally relieving the fluid pressure acting on the motor for causing the motor to move to an end position; an electric motor-operated pump for supplying fluid under pressure to the hydraulic motor; a condition-responsive device for controlling said electric motor; a pair of circuit controllers for the electric motor and for rendering the relieving means optionally active to relieve the pressure; means operated upon movement of the hydraulic motor from the intermediate position toward the other end position, for operating said circuit controllers in sequence to place the electric motor under the control of the condition-responsive device, and then to place the relieving means also under the influence of said condition-responsive device; and means independent of said condition-responsive device to render the relieving means ineffective to relieve the pressure until the hydraulic motor reaches said intermediate position.

7. In combination: a condition-responsive device including a circuit controller; a positionable member; a pair of circuits for respectively moving the member and for maintaining the member in any one of a pair of positions; switches having alternative positions respectively to connect and disconnect the condition-responsive device from the circuits; and means responsive to movement of said member to a definite position for operating the switches to place the circuits under the control of said circuit controller.

8. In combination: a condition-responsive device including a circuit controller; a positionable member; a pair of circuits for respectively moving the member and for maintaining the member in any one of a pair of positions; and means responsive to movement of said member to a definite position for first placing the circuit that moves the member under the control of the circuit controller, and then placing the maintaining circuit under the control of the circuit controller.

9. In combination: a condition-responsive device including a circuit controller; a positionable member; a pair of circuits for respectively moving the member and for maintaining the member in any one of a pair of positions; means responsive to movement of said member to a definite position for placing the circuits under the control of said circuit controller; and means for independently rendering the maintaining circuit ineffective.

10. In a system of the character described: a hydraulic motor; an actuator operated by the motor; a source of motion for creating liquid pressure to operate the motor for moving the actuator in one direction; means for urging the actuator in the other direction to move said actuator when said source of motion is ineffective; means responding to the movement of the actuator under the influence of said liquid pressure to an intermediate position to stop the source of motion; and condition-responsive means controlling said source of motion only when the actuator has reached said intermediate position.

11. In a system of the character described: a hydraulic motor; an actuator operated by the motor; a source of motion for creating liquid pressure to operate the motor for moving the actuator in one direction; means for optionally relieving said pressure; means for urging the actuator in the other direction to move said actuator only when said source of motion is ineffective and the relieving means is effective to relieve said pressure; means responding to the movement of the actuator under the influence of said liquid pressure to an intermediate position, to stop the source of motion; and condition-responsive means controlling said source of motion only when the actuator has reached said intermediate position.

12. In a system of the character described: a hydraulic motor; a condition-responsive device; an actuator operated by the motor, and having three positions corresponding first, to inactive position; second, to an intermediate position; and third, to a limiting active position; and means responding to the movement of the actuator to said second position for placing the motor under the control of the condition-responsive device.

13. In a system of the character described; a hydraulic motor; a pump for supplying liquid under pressure to the motor; means optionally relieving said pressure; means for stopping the pump; an actuator operated by the motor, and having a first position corresponding to inactivity, a second intermediate position, and a third limiting position; a condition-responsive device; means responding to the movement of the actuator to said second position to place the pump and the pressure relieving means under the control of the condition-responsive device; and means effective to return the actuator to its first position when the pump is inactive and the pressure is relieved.

14. In a system of the character described: an actuator having three positions; power-operated means for moving said actuator to the first, the second, or the third position; means for controlling operation of said power-operated means to effect movement of said actuator from said first to said second position; and condition-responsive means, rendered effective by said movement of the actuator to said second position, for controlling the operation of the power-operated means only between said second and third positions.

15. In a system of the character described: an actuator having three positions; power-operated means for moving said actuator in alternate directions to the first, the second, or the third position; first means for controlling operation of said power-operated means so as to effect movement of said actuator between said first and second positions; and condition-responsive means, rendered effective by movement of said actuator to said second position under the control of said first controlling means, for controlling the operation of said power-operated means to effect movement of the actuator only between said second and third positions; said first controlling means being capable of effecting movement of the actuator to said first position from any position in said range regardless of the condition of said condition-responsive means.

References Cited in the file of this patent

UNITED STATES PATENTS

| | | |
|---|---|---|
| 1,379,895 | Aveline | May 31, 1921 |
| 1,836,813 | Rankin | Dec. 15, 1931 |
| 1,851,902 | Haeghen | Mar. 29, 1932 |
| 1,984,558 | White | Dec. 18, 1934 |
| 2,044,044 | Anthony | June 16, 1936 |
| 2,193,125 | Evans et al. | Mar. 12, 1940 |
| 2,478,068 | Wallace | Aug. 2, 1949 |
| 2,503,478 | Grime | Apr. 11, 1950 |
| 2,557,880 | Lynn | June 19, 1951 |
| 2,604,075 | Naud | July 22, 1952 |

FOREIGN PATENTS

| | | |
|---|---|---|
| 273,033 | Germany | Apr. 17, 1914 |